Patented May 14, 1946

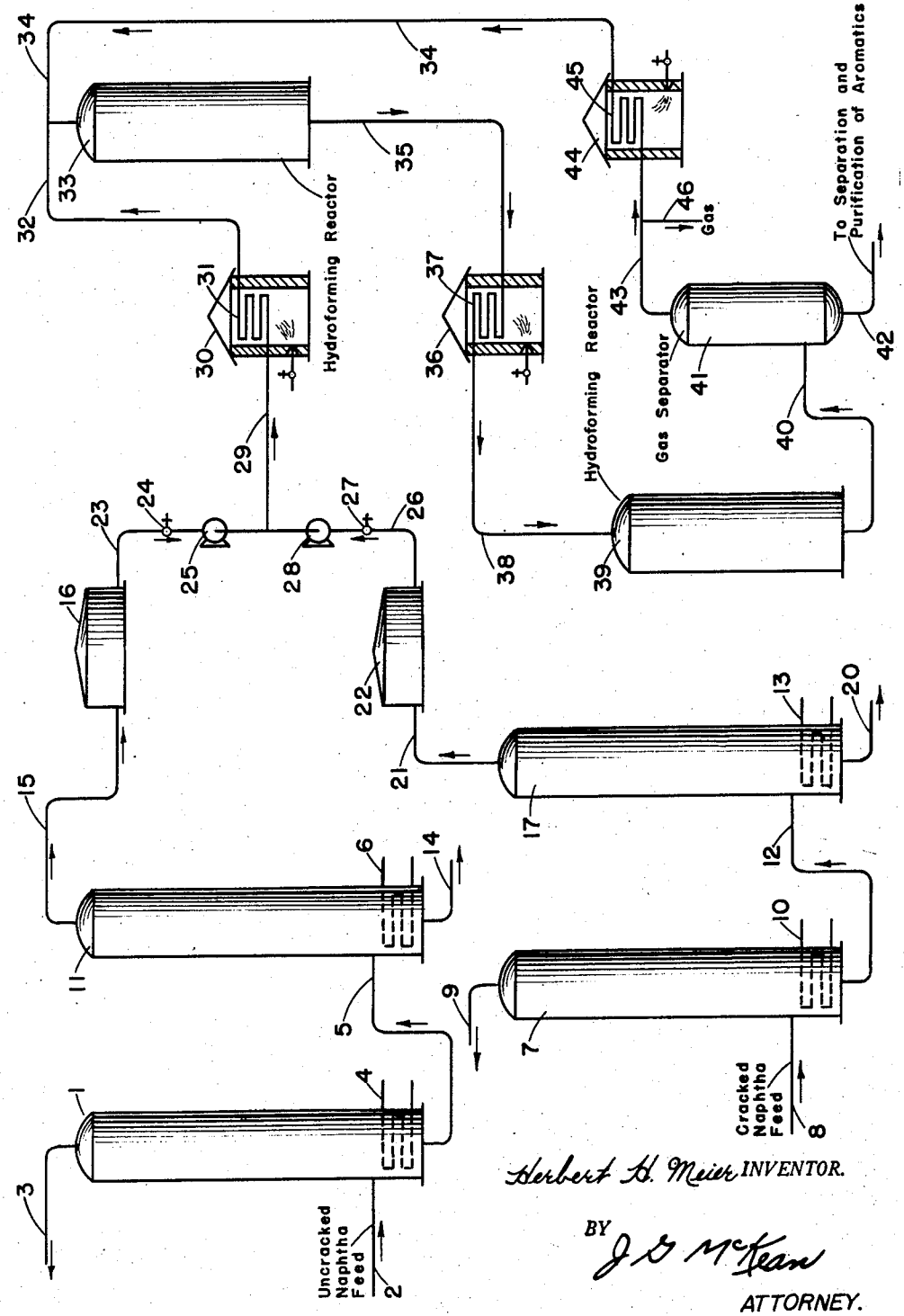

2,400,363

UNITED STATES PATENT OFFICE 2,400,363

PRODUCTION OF AROMATICS

Herbert H. Meier, Baytown, Tex., assignor to Standard Oil Development Company, a corporation of Delaware Application April 9, 1943, Serial No. 482,385

6 Claims. (Cl. 260—668)

The present invention relates to an improved method for producing aromatic compounds. More particularly it is concerned with a method of hydroforming petroleum hydrocarbons to obtain improved yields of toluene.

Hydroforming operations have been described in literature, for example, in the Oil and Gas Journal, March 27, 1941, page 86, and in the Journal of Petroleum Technology, January, 1944, pages 3 and 4, and may be characterized as those chemical reactions which take place when hydrocarbon oils, particularly hydrocarbons boiling in the gasoline range, are reacted at a temperature in excess of 500° F. in the presence of hydrogen and a reforming catalyst; these reactions involve a net effect of taking hydrogen away from the hydrocarbon molecules, the chemical reactions involved are complex but are generally considered to consist mainly of dehydrogenation and cyclization although other reactions, such as cracking, hydrogenation and desulfurization, may also occur.

Hydroforming processes as defined herein are endothermic reactions and, consequently, heat must be supplied to the reaction zone to maintain the temperature required for the reaction to proceed. These hydroforming reactions are carried out in the presence of catalysts which gradually lose their activity to promote the desired reaction because of the formation or deposition thereon during use of carbonaceous material such as coke. These contaminants must be removed periodically in order to regenerate the activity of the catalyst.

The catalysts employed in hydroforming reactions may be selected from a wide variety of materials. Especially satisfactory catalysts of this type comprise major proportions of aluminum oxide and minor proportions of oxides or sulfides of metals of the IV, V, VI, and VIII groups of the periodic system. The oxides and sulfides of vanadium, molybdenum, chromium, tungsten and nickel are particularly effective. Various forms of aluminum oxide may be used such as activated alumina, bauxite, alumina hydrates, alumina gels and peptized alumina gels. As examples of the type of catalyst found suitable in hydroforming operations may be mentioned alumina or peptized alumina gels containing from 1 to 20% by weight of certain molybdenum oxides or chromium oxides.

Prior to the present invention it was the usual practice to employ in the production of toluene and other hydrocarbons belonging to the same homologous series, hydrocarbon fractions recovered solely from the distillation (without cracking) of crude petroleum oils. Heretofore, when efforts were made to charge cracked materials of the proper boiling range to obtain toluene to a hydrofroming operation, considerable difficulties were experienced due to coke formation resulting from the high concentration of olefins in the feed hydrocarbons. Moreover, the presence of large amounts of olefins and relatively small amounts of toluene-producing materials in the cracked fractions made the recovery of the toluene constituents relatively difficult to effect.

Accordingly, the industry abandoned efforts to recover aromatic constituents from cracked hydrocarbons and turned to the virgin naphthas. It may be seen that the amount of virgin materials available for the production of these valuable hydrocarbon constituents is necessarily limited directly by the amount of crude petroleum produced. The enormous quantities of the aromatic constituents potentially producible from cracked naphtha were therefore not available prior to the practice of the present invention for the production of toluene and allied hydrocarbons.

It is, therefore, the main object of the present invention to make available the aromatic hydrocarbons potentially producible from cracked naphthas by hydroforming under controlled conditions the cracked naphthas in admixture with virgin naphthas so that the aromatic fractions are readily obtainable therefrom.

Other objects of this invention will become clear on reading the following description.

In general the present invention resides in charging to a hydroforming system a mixed feed of virgin and cracked naphthas of the proper boiling range under conditions selected for conversion of the naphthenic type hydrocarbons in the fractions to aromatic hydrocarbons and the conversion of compounds of the class known as cycloolefins to the type of hydrocarbons generally referred to as naphthene hydrocarbons; the latter are in turn also converted to the aromatic hydrocarbons. The invention also contemplates the removal of a major portion of the unsaturated material contained in the mixed feed hydrocarbon fraction or its conversion into saturated compounds.

In its most specific aspects the present invention includes separately fractionating cracked or virgin naphtha in precise fractionating equipment containing at least 50 plates and operating with ratios of reflux to feed of the order of about 1.6 to 1.7:1 to obtain individual fractions boiling between about 200° to 240° F., 200° to 270° F., or 200° to 295° F. as desired. When it is desired to obtain maximum yields of toluene in the practice of the present invention, the combined cracked and virgin naphtha fractions boiling between 200° and 240° F. should be the preferred feed stock. However, when maximum toluene plus maximum xylenes are desired a somewhat wider fraction boiling between about 200° and 295° F. from both the cracked and virgin naphthas would be employed.

In most operations in accordance with the present invention, however, the narrow boiling fractions, the 200° to 240° F. fraction and the 200° to 270° F. fraction, are usually the feed stocks charged. The latter fraction of intermediate boiling range allows recovery of maximum toluene plus maximum xylenes consistent with the ability to recover the xylenes in a high state of purity by distillation. The reason for charging the fraction between 200° and 270° F. is that the ethyl and dimethylcyclohexanes which are converted to xylenes plus ethylbenzene, boil in the range of 247° to 266° F., while the corresponding aromatics boil in the range between 277° to 291° F. Hence, if the material boiling above 270° F. is eliminated, all of the potential xylenes from the corresponding naphthenes may be recovered in a high state of purity by precise distillation after conversion thereto. It is to be realized, however, that by employing the fraction boiling between 200° and 270° F., the natural xylenes already present are lost.

It is important in the practice of the present invention that very little, if any, material boiling below about 200° F. be included in any of the feed stocks. The reason for this limitation is that, in the fraction boiling below 200° F. there are very few naphthene hydrocarbons present, and the naphthene hydrocarbons that are available in the low boiling fraction are not a ready source of hydrogen. It is true that some of the naphthenes in the fractions boiling below 200° F. are converted under hydro-forming conditions but it has been found from actual commercial operations that these compounds on hydroforming result in the production of large amounts of carbonaceous compounds which deposit on and foul the catalyst and consequently decrease the reaction rate thereof and shorten the life of the catalyst.

In the preceding description, mention has been made of fractions of different boiling range. By way of explanation, it should be understood that the temperatures of the fractions referred to hereinbefore are all true boiling temperatures and were obtained by distilling the various fractions in precise analytical equipment.

The fractions of the desired boiling range from both the cracked and virgin naphthas are then combined in suitable proportions and charged to a furnace wherein the hydrocarbons are heated to a temperature between about 850° and 1100° F. From the furnace the admixed fraction is then discharged into a reaction vessel or vessels arranged in series containing a catalyst of the type described hereinbefore. After allowing a suitable time of reaction in the catalyst chambers, gas is separated from the hydrocarbons, heated, and recycled for admixture with the hydrocarbons entering the reactor. This recycled gas contains a high percentage of hydrogen which is removed from the hydrocarbons during reaction thereof.

As mentioned above, it is usual practice in hydroforming operations to provide two or more reactors in series for conducting the operation. Since the reaction is an endothermic reaction, there is usually a considerable drop in temperature of the material passing through the bed of catalyst. Therefore, it is necessary to reheat material leaving one catalyst chamber before it is routed to the other if the highest possible conversion to aromatics is to be effected. The amount of heat required in reheating is lower in the present invention than in conventional operations. Removal of hydrogen from naphthenic hydrocarbons, as mentioned before, absorbs heat, while addition of hydrogen to olefinic types of hydrocarbons is a heat-producing or exothermic reaction. By virtue of the fact that a certain proportion of olefins are provided in the feed stock in the practice of the present invention and the bulk of the olefins react with hydrogen to produce saturated compounds, the amount of heat consumed in the reaction is considerably less than in ordinary operations. This phenomenon allows obtaining of higher average catalyst bed temperatures with a consequent increased feed rate through the operating unit or higher rates of reaction, whichever may be preferred.

The amount of cracked naphtha included in the virgin naphtha feed will vary depending on the naphthene content of the hydrocarbon feed being processed and on the boiling range of the fractions, either virgin or cracked. In general it has been found unsafe to include more than 50% of cracked naphtha in the feed to the hydroforming operation. However, in certain types of equipment and with hydrogen enrichment, it may be possible to include even higher per cents of cracked naphtha in the feed hydrocarbons.

The term "hydrogen enrichment" is well known in the hydroforming art and comprises removing contaminating gases from the recycled gases introduced into the reaction by absorption of the heavier materials so that a substantially purified hydrogen is introduced into the reactor.

The present invention will be better understood by reference to the drawing in which the single figure is a flow diagram illustrating one embodiment employed in practicing the invention.

Referring now to the drawing, numeral 1 designates a fractionating tower into which is introduced a virgin naphtha by way of line 2. Fractionating tower 1 is provided with line 3 for removal therefrom of light fractions boiling below 200° F., and with heating means 4 for adjustment of temperature and pressure conditions. The material boiling above 200° F. discharges from fractionating tower 1 by way of line 5 and is introduced thereby into second fractionating tower 11.

In fractionating tower 11, it will be assumed that the preferred method of operation is for the production of maximum amounts of toluene and in this event the conditions are adjusted in tower 11 by heating means 6 to take overhead therefrom by way of line 15 a fraction boiling between 200° and 240° F. The material taken overhead through line 15 is discharged into storage tank 16 and is accumulated therein for use as will be described hereinafter.

Similar to fractionating tower 1, in fractionating tower 7 a cracked naphtha fraction is introduced by way of line 8 for removal of material boiling below 200° F. by way of line 9; adjustment of temperature conditions in tower 7 for distillation is accomplished by heating means 10.

The products boiling above 200° F. discharge from fractionating tower 7 by way of line 12 and are introduced thereby into fractionating tower 17 in which the proper temperature conditions for distillation are maintained by heating means 13. A fraction boiling between 200° and 240° F., similar in boiling range to that removed from fractionating tower 11 by way of line 15, is taken overhead from the fractionating tower 17 by way of line 21 and is accumulated in storage tank 22.

The virgin and cracked naphthas accumulated in tanks 16 and 22 are removed therefrom, respectively, by way of line 23, valve 24 and pump 25, line 26, valve 27 and pump 28 and are combined in line 29. Valves 24 and 27 allow proper proportioning of the two feed stocks for best results. The combined stream flows through line 29 into heating coils 31 located in furnace 30 in which the mixture is heated to a temperature of about 1115°. The heated oil flows from coil 31 by way of line 32 and is introduced thereby into reactor 33 in which is maintained a bed of catalyst (not shown) of the type described before. Along with the stream of heated hydrocarbons introduced in the reactor 33 by way of line 32 is a stream of heated gas which is injected by way of line 34. The reactor is maintained at a pressure of about 200 to 250 lbs./sq. in.

As mentioned before, the temperature in the reactor drops due to the removal of hydrogen from the naphthenic type of hydrocarbons. This temperature drop through reactor 33 will range in the order of about 140° to 160° F. Therefore, the material leaving reactor 33 by way of line 35 is reheated in coil 37 as it passes through furnace 36. The temperature of the oil leaving coil 37 is of the order of about 1000° F. and it is discharged therefrom through line 38 into second reactor 39 which is also provided with a bed of catalyst (not shown) of the type described above. A temperature drop is also experienced by the oil passing through reactor 39. After passage through reactor 39, the hydrocarbons are discharged therefrom by way of line 40 and are introduced into gas separator 41 wherein a separation between gaseous and liquid products is made. The hydrocarbons discharged from gas separator 41 by way of line 42 are then routed to fractionation and purification zones (not shown) for recovery of the desirable constituents, while the separated gases are removed by way of line 43 and are heated in coil 45 during passage through recycle-gas heater 44. Excess gas not required in the operation is discharged as make-gas by way of line 46. As described before, the heated recycle gas is introduced by line 34 into reactor 33.

It is understood that the gas leaving gas separator 41 may be purified for removal of extraneous constituents and for concentration of hydrogen therein.

In order to illustrate the effectiveness of the present invention, several runs were performed in hydro-forming equipment in which mixtures of virgin and cracked naphtha were compared with the conventional operation when charging virgin naphthas only. In one run a mixture of 80% virgin naphtha and 20% catalytically cracked naphtha was charged and in another run the charge stock consisted of 80% virgin naphtha and 20% cracked naphtha from a thermal cracking operation. Since the several runs were made at different times and different charge stocks were employed, separate runs were made on two virgin naphthas for a true comparison with the runs in which catalytically cracked and thermally cracked naphtha were employed in admixture.

The results of these several runs are shown in the following table:

*Table I*

| | Feed stock | | | |
|---|---|---|---|---|
| | 100% virgin naphtha | 80% virgin naphtha plus 20% catalytically cracked naphtha[1] | 100% virgin naphtha | 80% virgin naphtha plus 20% thermally cracked naphtha |
| Temperatures, °F.: | Feed | Feed | Feed | Feed |
| Reactor inlet | 1,050 | 1,050 | 1,052 | 1,049 |
| Delta T | 225 | 203 | 228 | 206 |
| Average catalyst | 850 | 880 | 848 | 876 |
| Hydrogen in recycle: | | | | |
| Gas, vol. per cent | 90 | 82 | 85 | 80 |
| Yields based on feed: | | | | |
| Total toluene, vol. per cent | 8.5    21.4 | 14.7    29.7 | 4.9    18.3 | 6.7    21.3 |
| Synthetic toluene, vol. per cent | 12.9 | 15.0 | 13.4 | 14.6 |
| Methylcyclohexane plus ethylcyclopentane, vol. per cent | 23.4    6.3 | 24.0    2.9 | 22.7    4.1 | 22.7    3.4 |
| Carbon, wt. per cent | 0.04 | 0.07 | 0.09 | 0.10 |
| Dry gas, wt. per cent | 4.4 | 4.7 | 4.6 | 5.3 |
| Stabilized condensate, vol. per cent | 92.5 | 91.4 | 92.8 | 92.0 |
| Percent unsaturates in 200–250° F. cut | 1.0 | 1.0 | 1.0 | 1.0 |
| Synthetic toluene yield based on methylcyclohexane in feed, vol. per cent | 55 | 63 | 59 | 64 |

[1] 205–240° F. cut from fluid catalytic cracking. Analysis showed 39.3% toluene and 26.5% naphthenes in the 205–225° F. boiling range (assumed to be methylcyclohexane plus ethylcyclopentane).

It is understood that the expression "delta T" used in the foregoing table signifies the drop in temperature of the material passing through the catalyst bed. It follows that a smaller delta T for a given run shows that less heat was consumed in the reaction.

It will be observed from a study of the results in the preceding table that the delta T for the runs in which the cracked products were employed was considerably smaller than those in which virgin naphtha was the sole charge stock. This is an appreciable advantage since it represents less heating necessary in reheat furnace 36 described in conjunction with the drawing. It is also noteworthy that the amount of synthetic toluene produced in the runs is considerably larger than the amount produced when virgin naphthas were employed solely. It will be appreciated that the amount of toluene produced in the runs conducted in accordance with the present invention is over and above that which would be expected from the amount of methylcyclohexane and ethylcyclopentane present in the feed stock. This is an unexpected result and is an important advantage for operating as outlined hereinabove. Just why larger amounts of toluene are obtainable when a mixture of cracked naphtha and virgin naphtha is employed as a feed stock than when only virgin naphtha is charged is not completely understood; however, it is theorized as one explanation of the improved result, that cycloolefins are being converted during the process operation to toluene; it has been established that such cycloolefins are present to an appreciable extent in cracked naphthas. This fact had not been appreciated prior to the present invention.

Another noteworthy unexpected result of the practice of the present invention is the small amount of carbon deposited on the catalyst during the two operations in which cracked naphtha was present. In the case where catalytically cracked naphtha was employed, the amount of carbon produced was increased from 0.4% to .07%; while in the case where thermally cracked naphtha was included with the feed, the amount of coke increased from .09% to .10%. The amount of coke formation in these two runs in which the cracked material is included is only sightly in excess of that produced when virgin naphthas were employed. This is contrary to the early practice in the hydroforming art when large quantities of coke were formed as a result of hydroforming thermally cracked stock.

In the practice of the present invention, it is to be understood that, when it is desired to produce toluene from cracked materials, it is desirable to charge closely fractionated stocks boiling between about 200° and 240° F., and it is necessary that the end point of the feed be limited to about 300° F. if excessive coke formation is to be avoided. When efforts were made to charge cracked naphthas of a wider boiling range along with virgin naphthas of wide boiling range of the order of about 180° to 350° F., unsuccessful results were obtained in including more than 5 or 10% of cracked naphtha in the mixture. Excessive amounts of coke were formed and deposited on the catalyst and rapid temperature rise in the catalyst bed was observed. Furthermore, the amount of gas produced was increased, while the hydrogen content of the recycled gas decreased appreciably. It will be appreciated from these unsuccessful efforts that the successful operation of the present invention is predicated on rather critical limits which include hydrocarbon feed stocks of narrow boiling range, a carefully proportioned quantity of cracked naphtha to virgin naphtha and, as a result of the careful proportioning of the cracked naphtha to virgin naphtha, control of the olefin content of the mixed hydrocarbon charge to the system. It is to be emphasized that two of the great advantages of the present process are the removal of olefins during the operation and the conversion of olefinic material to desirable aromatic hydrocarbons.

Although the present invention has been described with relation to the production of toluene from selected narrow-cut hydrocarbon fractions, it follows that the invention may be adapted to production of benzene, xylenes and other hydrocarbons of the same homologous series. When it is desired to produce benzene or xylenes, for example, it will be necessary to select natural and cracked naphtha fractions of the proper boiling range which contain the naphthenes and/or cycloolefins which convert to the aromatics on hydroforming. The fractions which contain the benzene or xylene-producing hydrocarbons may be a fraction of rather wide boiling range but preferably it is one that boils within narrow limits as has been described earlier in the specification.

It will be realized from reading the foregoing description that either thermally or catalytically cracked hydrocarbons may be employed as the feed stock with the virgin naphtha. It is also within the spirit and scope of the present invention to inject extraneous amounts of olefins into thermally cracked or catalytically cracked naphtha provided the amount of olefin contained therein is small and provided the olefinic fraction is of the proper boiling range.

While the present invention has been described with relation to the inclusion of about 20% of cracked naphtha in the virgin feed, it is to be understood that smaller or greater amounts than that used for illustration purposes may be charged. In general, however, the amount of cracked naphtha probably should not exceed 50% of the feed.

In the following table are given analyses of three natural naphthas which have been hydroformed successfully and three cracked naphthas of the type found unsuitable for hydroformer feeds; comparable analyses are also given on three blends containing 10 to 20% of cracked naphtha mixed with natural naphtha which were hydroformed successfully in commercial operations:

| | Fraction boiling between 200° F. and 250° F., percent by volume | | |
|---|---|---|---|
| | Naphthenes | Toluene | Olefins |
| Natural naphtha | 49.8 | 6.4 | [1] 0.4 |
| Do | 46.9 | 6.3 | [1] 0.7 |
| Do | 44.9 | 6.3 | [1] 0.8 |
| Cracked naphtha | 15.8 | 8.2 | 36.6 |
| Do | 18.6 | 8.1 | 34.7 |
| Do | 22.9 | 13.5 | 36.0 |
| 10% cracked naphtha 90% natural naphtha | 42.8 | 6.6 | 4.0 |
| 15% cracked naphtha 85% natural naphtha | 43.3 | 10.3 | 6.6 |
| 20% cracked naphtha 80% natural naphtha | 37.3 | 7.0 | 8.1 |

[1] Due to presence of small quantity of recycle stock.

Although the blends listed in the above table which have been hydroformed successfully have a maximum ratio of naphthenes to olefins of about 11 to 1, it has been found that considerably smaller ratios may be satisfactorily employed. As has been stated above, blends containing as much as 50% cracked naphtha in admixture with 50% natural naphtha are suitable, and in these blends the ratio of naphthenes to olefins may be as low as 1 to 1. It is important, however, that the naphthene-olefin ratio be no less than 1 to 1. From experience, it has been found that naphtha fractions containing 35% or 36% of olefins and from 16% to 23% of naphthenes are unsuitable as a hydroformer feed. When the ratio of naphthenes to olefinic constituents in the naphthene feed falls below 1 to 1, considerable coking troubles are encountered and the operation is generally unsuccessful.

The nature and objects of the present invention having thus been described and illustrated, what I desire to claim as new and useful and secure by Letters Patent is:

1. In a process for producing toluene by reacting a hydrocarbon feed stock boiling between 200° and 240° F. at a temperature in excess of 500° F. in the presence of a catalyst and hydrogen under such conditions that there is an over-all net production of hydrogen, the step of maintaining in the feed stock a ratio of naphthenes to olefins of at least 1 to 1.

2. A process in accordance with claim 1 in which said ratio is maintained by adding to a natural naphtha a substantial quantity of a cracked naphtha.

3. A process for producing aromatic hydrocarbons comprising the steps of admixing a first hydrocarbon fraction comprising substantial amounts of naphthenic materials with a second hydrocarbon fraction comprising susbtantial amounts of olefinic materials in such proportions that the ratio of naphthenic materials to olefinic materials is no less than 1 to 1, reacting said admixture at a temperature above 500° F. and in the presence of a catalyst and hydrogen under such conditions that there is an over-all net production of hydrogen and subsequently recovering a product rich in aromatic materials.

4. A process for producing aromatic materials comprising the steps of distilling an uncracked naphtha comprising substantial amounts of naphthenic materials to separate a first narrow boiling fraction containing substantial amounts of naphthenic materials, distilling a cracked naphtha comprising substantial amounts of olefinic materials to separate a second narrow boiling fraction comprising substantial amounts of olefinic materials, admixing said first and second fractions in such proportion that the ratio of naphthenic materials to olefinic materials in the admixture is no less than 1 to 1, heating said admixture to a temperature above 500° F. and passing it to a first zone and reacting it therein in the presence of a catalyst and hydrogen under such conditions that there is an over-all net production of hydrogen, removing the products from said first zone, heating said products to a temperature of approximately that of the admixture sent to the first zone and passing them to a second zone and reacting them therein in the presence of a catalyst and hydrogen under such conditions that there is an over-all net production of hydrogen, removing the reaction products from said second zone and separating aromatic constituents therefrom.

5. A process for producing aromatic hydrocarbons comprising the steps of admixing a first hydrocarbon fraction comprising naphthenic constituents with a second hydrocarbon fraction comprising olefinic constituents in such proportion that the ratio of naphthenic constituents to olefinic constituents in the admixture is no less than 1 to 1 and contacting said admixture with a bed of catalyst under a temperature in excess of 500° F. and in the presence of hydrogen under such conditions that there is an over-all net production of hydrogen and subsequently the recovering of a product rich in aromatic materials.

6. A process for producing aromatic hydrocarbons comprising the steps of maintaining a bed of catalyst at a temperature ranging from 850° F. to 1100° F., contacting said catalyst bed with an admixture of hydrocarbons comprising both olefinic and naphthenic materials with the ratio of olefinic materials to naphthenic materials no greater than 1 to 1 and in the presence of hydrogen, under such conditions that there is an over-all net production of hydrogen in the presence of said catalyst, removing the reaction products from contact with said catalyst bed and separating an aromatic constituent therefrom.

HERBERT H. MEIER.